United States Patent [19]
Fujii et al.

[11] 3,997,407
[45] Dec. 14, 1976

[54] APPARATUS FOR DISPOSAL OF RUBBER WASTE

[75] Inventors: Heihachiro Fujii, Fujisawa; Shiro Nebashi, Urawa; Yoshimasa Zaitsu, Kawasaki, all of Japan

[73] Assignee: Fuji Kasui Engineering Co., Ltd., Tokyo, Japan

[22] Filed: Sept. 3, 1975

[21] Appl. No.: 609,952

Related U.S. Application Data

[62] Division of Ser. No. 505,376, Sept. 12, 1974, abandoned.

[30] Foreign Application Priority Data

Dec. 24, 1973 Japan .............................. 49-000882
July 13, 1974 Japan .............................. 49-080527

[52] U.S. Cl. .................................. 202/221; 48/66; 48/69; 48/123; 202/262; 202/269; 202/270; 201/2.5

[51] Int. Cl.² ..................... C10B 1/04; C10B 35/00; C10B 45/00; C10J 3/72

[58] Field of Search .......... 202/121, 221, 222, 223, 202/225, 226, 261, 262, 265, 270; 48/73, 66, 68, 69, 87, 123

[56] References Cited

UNITED STATES PATENTS

| 1,001,398 | 8/1911 | Herrick | 48/69 |
| 1,493,880 | 5/1924 | Jenson | 202/262 |
| 2,971,830 | 2/1961 | Kawai et al. | 48/123 |

FOREIGN PATENTS OR APPLICATIONS

| 188,669 | 10/1923 | United Kingdom | 202/262 |

*Primary Examiner*—Morris O. Wolk
*Assistant Examiner*—Michael S. Marcus
*Attorney, Agent, or Firm*—Armstrong, Nikaido & Wegner

[57] ABSTRACT

A method and apparatus for disposal of rubber wastes is provided wherein rubber wastes such as scrap tires are dry-distilled in a vertical dry distillation retort of an internal heating type having a rotary discharge chute with a water seal, valuable substances contained in the rubber wastes, such as carbon black and oil, are effectively recovered and dry-distilled gas is used as a heat source for the dry distillation of the rubber wastes.

1 Claim, 3 Drawing Figures

APPARATUS FOR DISPOSAL OF RUBBER WASTE

This is a division of application Ser. No. 505,376 filed Sept. 12, 1974 now abandoned.

The present invention relates to a method and an apparatus for disposal of rubber wastes such as scrap tires and for recovering valuable substances such as oil and carbon black from the rubber wastes.

The amount of discarded used or scrap tires has been rapidly increasing recently due to the increasing numbers, as well as use, of road vehicles. Under these circumstances, question of how to dispose of waste rubber products, especially used or scrap tires, has become a problem of national importance.

Scrap tires and other rubber wastes have heretofore been piled in heaps at open air dumps or have heretofore been piled in heaps at open air dumps or have been burned. However, since rubber wastes do not naturally decompose very readily, there is a limit to open-air piling disposal. Further, as is well-known, when rubber wastes are burned by using conventional incineration techniques, dense black smoke is generated. Because of this, disposal of rubber wastes by conventional incineration techniques cannot continue because air pollution regulations are growing stricter every year.

In order to solve these problems, there have heretofore been proposed several methods in which rubber wastes such as scrap tires are burned without generating smoke by using special incinerators. However, these methods have not been adopted for industrial use because these methods are uneconomical and because valuable substances in the waste rubber products, such as for example, natural rubber, synthetic rubber, carbon black, process oil and the like, are wastefully burned away.

The objects of the present invention are, therefore, to overcome the above problems involved in conventional disposal of rubber wastes such as scrap tires, and to provide a method and an apparatus for disposal of rubber wastes, for recovering valuable substances such as, for example, oil and carbon black, for the rubber wastes, and to provide a method for using cracked gas as a heat source of a dry distillation retort of the present invention.

Other objects and advantages of the present invention will be apparent from the following description.

In accordance with the present invention, there is provided a method for the disposal of rubber wastes comprising dry distillating the rubber wastes by using a vertical dry distillation retort of an internal heating type, wherein a heating carrier gas from said dry distillation retort containing cracked gas and oil vapors generated by dry distillation of the rubber wastes is cooled to separate the cracked oil, then said carrier gas is recycled to a hot gas generating furnace and is burned with an auxiliary fuel therein to convert it to a high temperature heating gas, and said high temperature heating gas is fed to said dry distillation retort.

In accordance with the present invention, there is also provided a vertical dry distillation retort of internal heating type for the disposal of rubber wastes comprising:

a. a dry distillation retort body having a substantially cylindrical shape, the lower portion of which has a trapezoidal form, and having an inlet at the top thereof for feeding shredded rubber waste blocks to be treated, a dry distillation gas outlet in the upper portion thereof and an outlet hopper for discharging dry distillation residue;

b. a conical hood disposed in the center of the upper portion of the interior thereof to uniformly disperse the rubber blocks to be treated in said retort while appropriately sizing the rubber blocks to be treated according to the block size to, thereby, make the temperature distribution in said retort uniform, and to suck off the generated dry distillation gas;

c. means for feeding a hot gas for dry distillation disposed in the lower peripheral wall portion inside said port body to uniformly jet and feed the hot gas for dry distillation in the form of a thin layer laterally toward the center of said retort;

d. a dry distillation residue receiver rotatably mounted on a base and connected in a water-sealed fashion to said outlet hopper;

e. a screw conveyer provided with a vertical shaft, which extends from the bottom of said residue receives to the lower central portion of the interior of said retort body to discharge the dry distillation residue out of said retort body into said residue receiver;

f. a cone member fixedly mounted on the top of said screw conveyer to make the residence time of the rubber blocks in said retort uniform and to increase the dry distillation efficiency, and;

g. a discharge chute for discharging said dry distillation residue, fixed to the lower portion of said retort body, which chute extends in said residue receiver from the bottom inside edge thereof to the upper inside edge thereof while being in rough contact with the inner peripheral surface of said rotating residue receiver.

The present invention will be better understood from the following description taken in connection with the accompanying drawings in which.

Figure 1:
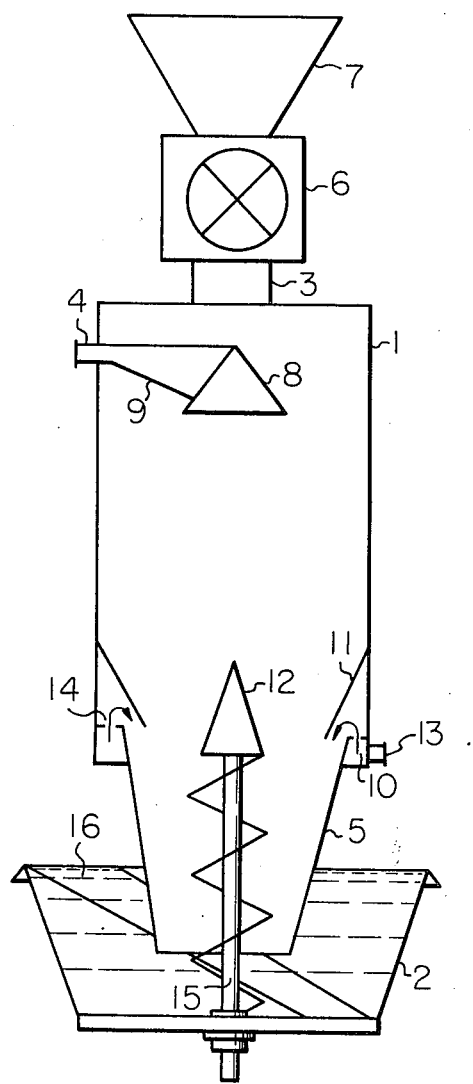
FIG. 1 is a schematic drawing showing a structure of a preferred embodiment of the present vertical dry distillation retort.
Figure 2:
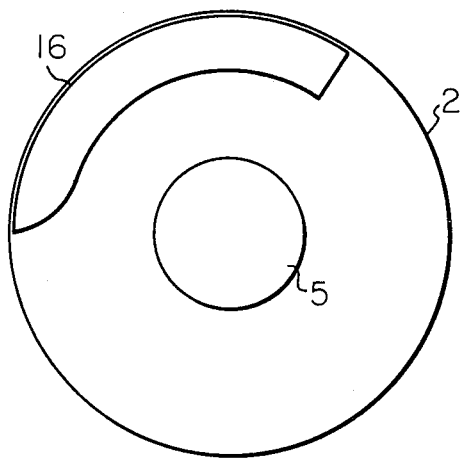
FIG. 2 is a top view showing a dry distillation residue receiver and a dry distillation residue discharge chute of the present dry distillation retort.

Referring now to the drawings, there is shown a preferred embodiment of the present dry distillation retort in FIGS. 1 and 2. The vertical dry distillation retort of internal heating type of the present invention comprises a dry distillation retort body 1 and a dry distillation residue receiver 2. The retort body 1 has a substantially cylindrical shape and the lower portion of the retort body 1 has a trapezoidal shape. An inlet 3 for feeding shredded rubber waste blocks to be treated is provided at the top of the retort body 1 and a dry distillation gas outlet 4 is provided in the upper side portion of the retort body 1. In the bottom of the retort body 1, an outlet hopper 5 for discharging dry distillation residue is formed.

Rubber wastes shredded into a predetermined size, for example approximately 50 to 150 mm in the case of a general industrial retort, are charged into the retort 1 at a substantially constant rate through the inlet 3, where a rotary feeder or damper 6 and a bunker 7 are mounted in order to feed the rubber wastes blocks into the retort 1. The rotary feeder 6 also serves to substantially prevent air contamination entering into the retort 1 and discharge of the dry distillation gas from the inlet 3.

A conical hood 8 is mounted in the upper center portion of the interior of the retort body 1 by a conventional suitable means, and it is connected to the dry distillation gas outlet 4 through a duct 9. This hood has two functions. One of these functions is to uniformly disperse the rubber blocks to be treated while sizing the rubber blocks (to disperse relatively large blocks in the center of the retort 1 and to disperse relatively small blocks in the portion near the periphery of the retort 1) and to make the temperature distribution in the retort 1 uniform. The other one of the two functions is to suck or collect the generated dry distillation gases, for example, oil vapors such as vapors of heavy oil and light oil, and gases such as hydrogen, methane, ethane, propane or the like. These gases are sucked out of the retort by a suction fan (not shown) through the hood 8, the duct 9 and the gas outlet 4.

In the lower peripheral wall portion inside said retort, a feed ring 10 for feeding a hot heating gas, having usually a temperature of approximately 500 to 700° C, and a hot heating gas guide member 11 are mounted as means for feeding a hot heating gas for dry distillation. The feed ring 10 is fixed to the peripheral wall in the interior of the retort 1 by a suitable means and has a hot heating gas inlet 13 and a plurality of a hot heating gas blow openings 14. In the embodiment shown in FIG. 1, the openings 14 are positioned on the upper portion of the feed ring 10, however, such positioning is not a requirement and the openings 14 may be positioned at other places on the feed ring 10. The guide member 11 is fixed to the inner wall of the retort body 1 to guide the hot heating gas stream discharged from the feed ring 10 and, also, to guide the rubber wastes blocks in order to assist in the distribution of the rubber blocks.

In the embodiment shown in FIG. 1, the hot heating gas for dry distillation is discharged from the top openings 14 of the feed ring 10 to the inside of the retort 1 and is discharged laterally towards the center of the retort body 1 through the slit or gap between the feed ring 10 and the guide member 11 (the gap distance is generally 50 to 80 mm).

A cone member 12 for accelerating the dry distillation comprising a substantially conical shape body is placed in the center portion of the retort 1, toward which the hot heating gas is directed after being discharged from the feed ring 10. The cone member 12 is fixedly mounted on the top of a screw conveyer 15, and accordingly in the embodiment shown in FIG. 1 the cone member 12 rotates together with the screw conveyer 15 which rotates slowly as mentioned below. However, the cone member 12 can be stationarily mounted, by a suitable conventional means, in the retort body 1. The cone member 12 functions as a device that unifies the residence time of the rubber blocks in the retort 1 and increases the dry distillation efficiency.

The dry distillation residue receiver 2 is rotatably mounted on a base (now shown) under the retort 1, and the outlet hopper 5 for discharging dry distillation residue is inserted into the residue receiver 2, which is filled with water so that the outlet hopper 5 is a water-sealed in the receiver 2. The receiver 2 is rotated slowly, for example, at a speed of approximately 0.5 – 1 rpm by appropriate conventional rotation means. The dry distillation residue is discharged from the outlet hopper 5 into the receiver 2 and is taken out of the receiver 2 by way of a discharge chute 16. The discharge chute 16 is fixed to the retort body 1 (not shown in FIGS. 1 and 2) and is mounted in contact with the inner peripheral surface of the rotating receiver 2 in such a manner that it extends in the receiver from the bottom inside edge thereof to the upper inside edge thereof. The shape of the chute 16 is preferably in the form of flat plate or concave plate, but it is not limited to this form.

In the center of the residue receiver 2, there is mounted a screw conveyer 15 provided with a vertical shaft, which extends substantially vertically from the bottom of the receiver to the lower central portion of the retort body. The screw conveyer 15 is rotated slowly independently of or dependently with the rotation of the receiver 2 by a suitable rotating means. The screw conveyer 15 serves as a device that smoothly discharges the dry distillation residue having a specific gravity of 0.4 – 0.5 from the retort 1 into the receiver, and it increases the treatment capacity by approximately 60%.

The present rubber wastes disposal process will now be illustrated by reference to the flow diagram shown in FIG. 3.

Shredded rubber waste blocks 21 are charged into a vertical dry distillation retort 22 of the internal heating type and dry-distilled by a hot carrier gas 23, whereby the rubber waste blocks 21 are decomposed into dry distillation gas and residual carbon. The residual carbon is composed mainly of carbon and is recovered through a residual receiver 25. This carbon is activated by using a conventional activation method and the activated carbon can be used again as active carbon or carbon filler for rubber products.

The dry distillation gas generated from the retort 22 contains gaseous products such as hydrogen, methane, ethane, propane and the like, and oil vapors such as light oil and heavy oil. This dry distillation gas, together with a hot carrier gas, is sucked from the retort 22 by means of a suction fan 27. The pressure of the dry distillation retort is generally maintained at a level of approximately -10 mmH$_2$0. The exhaust gas 26 from the retort 22 is cooled through a cooler 28 with cooling water and, thereby, oil vapors contained in the exhaust gas 26 are condensed. The condensed oil 31 is separated from the exhaust gas 26 in a gas-liquid separating vessel 30, and is recovered as fuel oil. The remaining gas 32 containing dry-distilled combustible gas components, as mentioned above, is sucked out of the separating vessel 30 by the fan 27, passes through a heat exchanger 33, where it is preheated, and is fed into a hot gas generating furnace 34.

In the hot gas generating furnace 34, the heating carrier gas containing the combustible dry-distilled gas and a small amount of an auxiliary fuel 35 are fed into the furnace 34 and burned. The resulting hot heating carrier gas 23, having a temperature of approximately 500° to 700° C, is then fed into the dry distillation retort 22 in an amount necessary for dry distillation, and the remaining excessive hot heating carrier gas is discharged as an exhaust gas into the open air. The flow rate of the hot carrier gas 23 into the retort 22 is controlled by a valve 36 which is positioned on the exhaust gas pipe line 37. The valve 36 is automatically or manually actuated according to, for example, the desired flow rate value of the hot carrier gas 23 into the retort 22 and, thereby, the excessive hot gas 23 is exhausted after heating the gas 32 in the heat exchanger 33. The condensed oil 31 separated from the separating vessel 30 can be preferably used as the auxiliary fuel 35 in the hot gas generating furnace 34.

As the hot carrier gas 23 introduced into the dry distillation retort 22 is so adjusted in the hot gas generating furnace 34 that only a small amount of oxygen is contained therein, the hot gas 23 decomposes the rubber waste blocks 21 in the retort 22 by its sensible heat, and the oxygen contained in the hot gas 23 in a small amount burns the oil vapors, dry distilled carbon and so on in the retort 22 to, thereby, accelerate thermal decomposition of the rubber waste.

As illustrated hereinabove, in accordance with a preferred embodiment of the present method for disposal of rubber wastes, the present dry distillation retort of the internal heating type is used, a dry distilled gas or cracked gas generated by dry distillation of rubber wastes and containing combustible gas such as, for example, hydrogen, methane, ethane, propane and the like is fed together with a heating carrier gas into the hot gas generating furnace and the hot heating carrier gas having a temperature of approximately 500° to 700° C, preferably 550° to 650° C for dry-distilling the rubber wastes in the retort is produced in the hot gas generating furnace by using a small amount of a fuel oil (auxiliary fuel) together with said dry-distilled or cracked gas. The hot heating carrier gas to be fed into the dry distillation retort is mainly composed of nitrogen gas ($N_2$) and also includes small amounts of carbon dioxide gas ($CO_2$), steam ($H_2O$), etc. A large majority of this heating carrier gas is recycled in the present disposal process as the hot heating carrier gas, and the amount of this hot heating carrier gas is increased by the gas formed by combustion of the generated dry-distilled combustible gas and the auxiliary fuel oil and this increased amount of hot heating carrier gas is discharged from the system to an open air.

The present invention has the following advantages compared to the conventional rubber waste disposal techniques.

1. The dry-distilled gas generated in the present process can be effectively utilized and, further, a hot gas having a relatively low temperature, i.e. approximately 500° to 700° C, can be easily obtained.

When a hot gas is obtained only by combustion of a fuel fed from the outside of the disposal system, the gas temperature becomes as high as approximately 1500° to 2000° C. and such a high temperature gas is not preferred as a rubber dry distillation gas. This is because, with such a high temperature, the apparatus must be constructed by using special materials such as, high temperature resistant and corrosion resistant materials, and violent gasification phenomenon, due to thermal cracking of oil components, is caused. If cold air is incorporated into this hot gas in order to lower its temperature, a combustion reaction of the rubber wastes is unpreferably caused in the dry distillation retort due to the presence of oxygen contained in the added cold air. It is, of course, possible to cool this gas by external cooling or by incorporation of a cold inert gas such as nitrogen, but each of these methods is economically disadvantageous. In contrast, in accordance with the present process, the hot gas used for dry distillation of rubber wastes is recycled to the hot gas generating furnace as the heating carrier gas, so that the generated dry-distilled gas contained in the heating carrier gas is burned and, further, the amount and the temperature of the hot gas necessary for dry distillation of rubber wastes can be easily obtained by using a small amount of an auxiliary fuel. In addition, oil recovered by dry distillation of rubber wastes in the present process can be advantageously used as the auxiliary fuel.

2. The outlet gas temperature of the present dry distillation retort can be maintained at a low level.

The oil fraction obtained by dry distillation of rubber wastes is a heavy oil having a relatively high boiling point, such as, approximately 400°–450° C under atmospheric pressure. In the present disposal process of rubber wastes, a considerable amount of the hot heating gas is present in the dry distillation retort and, hence, the boiling point of the oil is lowered by an amount corresponding to the partial pressure of the heating carrier gas. Accordingly, the oil can be dry distilled at the retort outlet temperature of approximately 200° to 250° C. That is the heat energy corresponding to the temperature difference between the temperature of the hot gas at the retort inlet and that of the hot gas at the retort outlet is transferred to the rubber wastes to be treated and, therefore, the present method is economically advantageous. Further, since the temperature of the dry distillation exhaust gas is low, cooling of the exhaust gas can be economically conducted by using a small sized cooler and a small amount of cooling water.

3. The hot carrier gas used in the present process is mainly composed of inert gases such as nitrogen, carbon dioxide, steam, so that the disposal operation can be conducted with safely without danger of gas explosion.

4. The heat energy of the exhaust gas from the present system having a temperature of approximately 500° to 700° C can be utilized for pre-heating the heating carrier gas to be recycled. In addition the exhaust gas is a complete combustion gas from hydrocarbons (its sulfur oxides $SO_x$ content is equal to or lower than the $SO_x$ content in an exhaust gas from a boiler in which low sulfur fuel oil is burned) and the amount of the exhaust gas discharged in a rubber waste disposal plant having a capacity of 5 tons/day according to the present invention is as small as approximately 200 $Nm^3$/hr.

The invention will be further illustrated by, but is by no means limited to, the following Example.

Example

Figure 3:
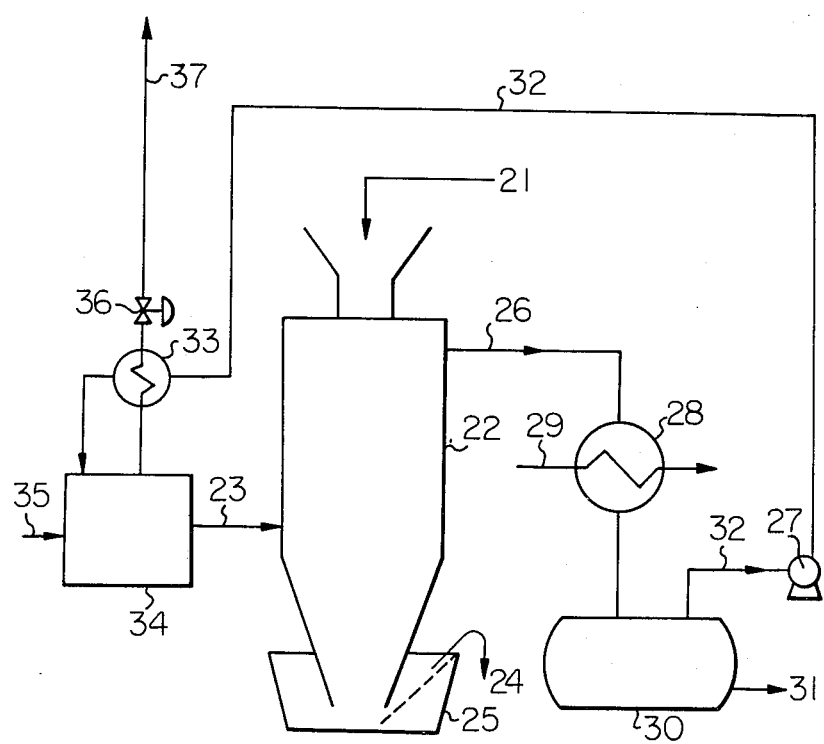
FIG. 3 is a flow diagram illustrating the method of the present invention.

Used passenger tires were dry-distilled according to the process shown in FIG. 3.

Used tires were shredded to a size of approximately 50 mm pieces through approximately 250 mm pieces and charged into a dry distillation retort of the present invention, as shown in FIG. 1, having a diameter of approximately 1 m and a length of approximately 2 m from the top thereof, and were continuously dry-distilled under the following conditions.

| | |
|---|---|
| Feed rate of tire scraps: | 1500 kg/day |
| Temperature of hot gas for dry distillation: | about 600° C |
| Flow rate of hot gas for dry distillation: | 150 $Nm^3$/hr. |
| Temperature in dry distillation retort (central portion): | about 550° C |
| Pressure in dry distillation retort: | −10 $mmH_2O$ |
| Exhaust gas temperature at outlet of dry distillation retort: | about 250° C |

The exhaust gas from the outlet of the dry distillation retort passed through a cooler, where the exhaust gas was cooled to approximately 40° C and condensed oil was collected. The amount of the oil thus obtained was 750 l/day. The cooled exhaust gas, was then recycled, as a heating carrier gas, into a hot gas generating furnace through a heat exchanger where the hot carrier gas was heated to 90° with off-gas from the hot gas generating furnace. The above collected condensed oil was fed into the hot gas generating furnace at a rate of 75l/day as an auxiliary fuel and was burned at 800° C together with the dry distillation gas contained in the heating carrier gas to be recycled. The hot gas from the combustion was fed, as a hot gas for dry distillation, to the distillation retort at a rate of 150 Nm³/hr., and the excess hot gas was discharged into the open air through the heat exchanger where it was used for pre-heating the heating carrier gas to be recycled.

The amount of the residual carbon obtained from the dry distillation retort was 600 kg/day.

What is claimed is:

1. A vertical dry distillation retort of internal heating type for the disposal of rubber wastes for recovering valuable substances contained therein comprising:
  a. a vertical dry distillation retort body having an upper portion with a substantially cylindrical shape, and a lower portion which is trapezoidal in shape, said retort having an inlet means at the top of the upper cylindrical portion for feeding shredded rubber waste blocks to be treated and a dry distillation gas outlet means in the upper portion thereof, said lower portion forming an outlet hopper means for discharging dry distillation residue from said retort.
  b. a conical hood means connected to said gas outlet means and disposed in the center of the upper portion of said retort to uniformly disperse the rubber blocks to be treated in said retort while appropriately sizing the rubber blocks to be treated according to the block size to, thereby, make the temperature distribution in said retort uniform, and to suck off the generated dry distillation gas,
  c. means for feeding a hot heating gas for dry distillation disposed in the lower peripheral wall of said upper portion inside said retort body to uniformly jet and feed the hot gas for dry distillation in the form of a thin layer laterally toward the center of said retort, said feed means comprising a feed ring and a hot gas guide means attached to said lower peripheral wall with said guide means located above said feed ring,
  d. a dry distillation residue receiver means rotatably mounted on a base and connected in a water-sealed fashion to said outlet hopper,
  e. a screw conveyer means provided with a vertical shaft, which extends from the bottom of said residue receiver through said hopper means to a lower central section of the upper portion of said retort body to discharge the dry distillation residue out of said retort body into said residue receiver means,
  f. a cone member fixedly mounted on the top of said screw conveyer means to make the residence time of the rubber blocks in said retort uniform and to increase the dry distillation efficiency, and
  g. a discharge chute means for discharging said dry distillation residue, fixed to the lower portion of said retort body, which chute extends in said residue receiver means from the lower inside edge thereof to the upper inside edge thereof while being in contact with the inner peripheral surface of said rotating residue receiver means.

* * * * *

UNITED STATES PATENT OFFICE
CERTIFICATE OF CORRECTION

Patent No. 3,997,407    Dated December 14, 1976

Inventor(s) Heihachiro Fujii et al.

It is certified that error appears in the above-identified patent and that said Letters Patent are hereby corrected as shown below:

Please amend item [73] on the cover page to read

-- Fuji Kasui Engineering, Co., Ltd., The Yokohama Rubber Co. and Otsuka Iron Works, Ltd. --

Signed and Sealed this

Twenty-fourth Day of May 1977

[SEAL]

Attest:

RUTH C. MASON
Attesting Officer

C. MARSHALL DANN
Commissioner of Patents and Trademarks